Oct. 9, 1928.
S. N. HURT
1,686,750
WEIGHING SCALE
Filed Dec. 29, 1924
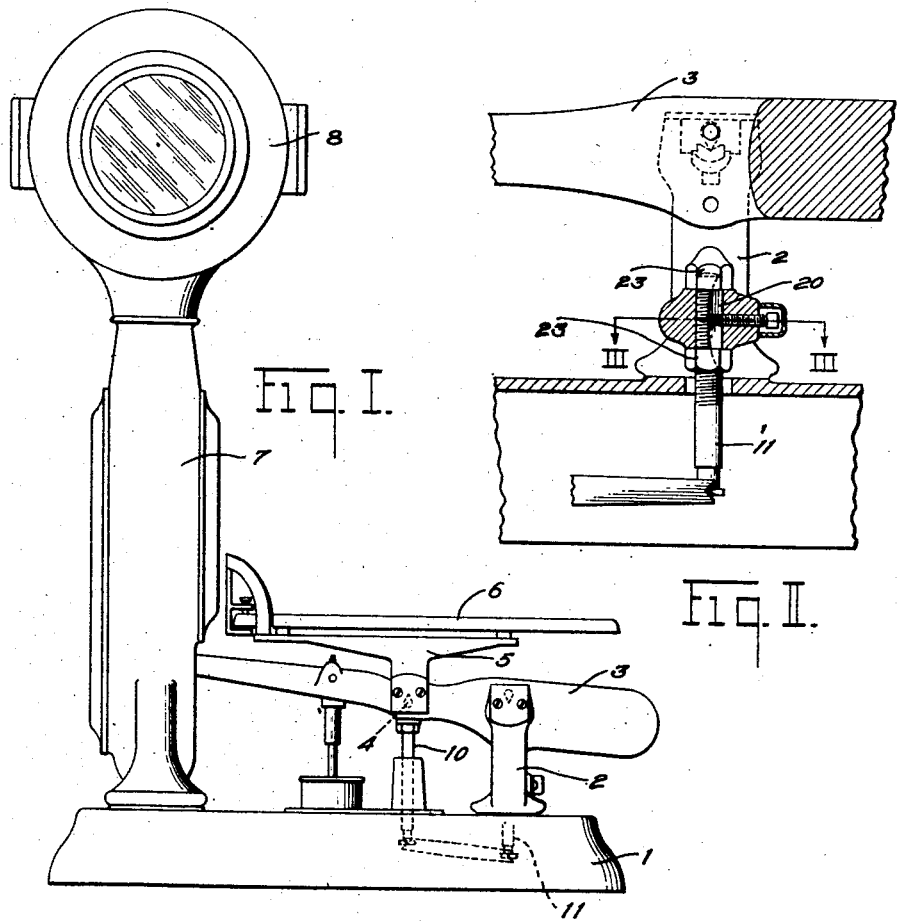
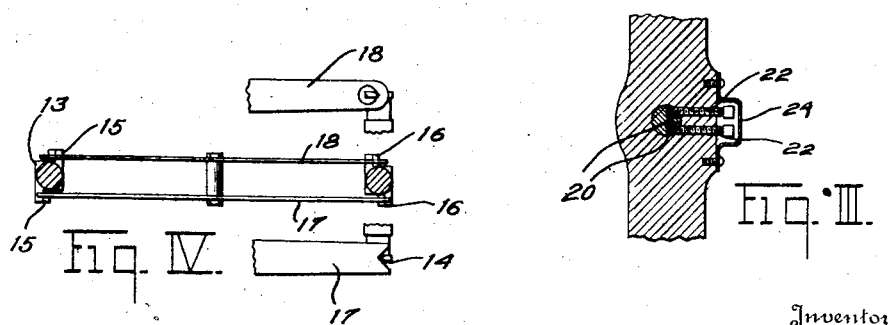
Inventor
Samuel N. Hurt.
By Marshall
Attorney Patented Oct. 9, 1928.

1,686,750

UNITED STATES PATENT OFFICE.

SAMUEL N. HURT, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 29, 1924. Serial No. 758,551.

This invention relates to weighing scales, and more particularly to devices for maintaining the platform level throughout weighing movements.

In scales of the type having the commodity receiving platform supported upon two bearing pivots carried by the scale beam it is necessary to employ a check link or stabilizing mechanism to prevent tilting of the platform when the load to be weighed is placed adjacent the edges thereof and to secure the proper distribution of weight upon the scale beam so that an accurate weight of the commodity may be had.

It is one of the principal objects of this invention to provide a means whereby the checking mechanism may be readily adjusted without the use of special tools.

Another object of this invention is the provision of simple means for adjusting the checking or platform stabilizing means which is readily accessible and inexpensive to manufacture.

Still another object is the provision of a means for adjusting the checking mechanism of a scale which may be locked in adjusted position to prevent further derangement of the mechanism.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale embodying my invention;

Figure II is an enlarged fragmentary sectional view through a portion of the scale;

Figure III is an enlarged fragmentary sectional view taken substantially on the line III—III of Figure II, showing the adjusting means of my invention; and Figure IV is a view showing details of the check link construction.

Referring to the drawings in detail, I have shown my invention by way of example as applied to a scale of the so-called cylinder type, but it is to be understood that my invention is also applicable to other types of scales.

As the scale proper forms no part of my invention, it will, therefore, be described only in such detail as to show the connection of my invention thereto. The scale illustrated comprises a base 1 provided at one end with the usual fulcrum support or base horn 2, upon which is fulcrumed the main lever 3 of the scale. The lever is also provided with load pivots 4 upon which is mounted a spider or platform support 5 provided with a suitable commodity receiver or platform 6. The nose end of the lever 3 projects into an upright housing 7 erected on the base 1 and is operatively connected to load-counterbalancing mechanism (not shown) supported in said housing and to indicating mechanism housed within the head 8 surmounting the housing 7.

In order to secure an accurate weighing scale it is necessary that the commodity receiver or platform remain level at all times. To this end I have provided the spider 5 and the fulcrum support 2 with depending rods or posts 10 and 11 having reduced end portions to which are secured the plates 13 and 14 having diagonally projecting ears 15 and 16 provided with oppositely disposed knife edges. Connecting the knife edges is a pair of parallel links 17 and 18, the link 17 being provided with a V-shaped notch at each end adapted to receive the knife edges of the plates 13 and 14 extending toward each other, and the link 18 being provided with an eye at each end embracing the knife edges which extend away from each other. An efficient push-and-pull connection is thus provided whereby the parallelogram formed by the load and fulcrum pivots and knife edges on the plates 15 and 16 is maintained throughout weighing movements of the scale.

Heretofore it has been very difficult to maintain the adjustment of the knife edge members so that lost motion between the members 17 and 18 and knife edges is reduced to a minimum. To obviate such difficulties I have provided reliable and efficient means for adjusting the knife edges of the stationary post 11, which will now be described.

The upper portion of the post 11 is provided with a pair of spaced slots or grooves 20, and threaded into the central portion of the fulcrum stand 2 is a pair of screws 22, the ends of which engage the walls of the grooves in the post 11, more particularly shown in Figure III. It will be apparent that by skillful manipulation of the screws 22 the post 11 may be accurately adjusted so as to eliminate or reduce to a minimum lost motion between the links 17 and 18 and knife edges and the post 11 locked in adjusted position by means of the nuts 23. A cover or cap 24 serves to enclose the heads of the screws 22 after necessary adjustments have been made.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, weighing mechanism including a platform lever, a commodity-receiver supported on said platform, a check link comprising push and pull members, means for pivotally connecting said check link to said commodity-receiver, means pivotally connecting said check link to said frame, one of said connecting means comprising a member provided with a knife edge pivot, said member having a pair of depressions, and means including a pair of screws engaging said depressions for adjusting said member about an axis at right angles to the edge of said pivot.

2. In a device of the class described, in combination, a frame, weighing mechanism including a platform lever, a commodity-receiver supported on said lever, a check link consisting of push and pull members, means for pivotally connecting said check link to said commodity-receiver and said frame, one of said means consisting of a post rotatable about a vertical axis and provided with a knife edge pivot extending at right angles to said axis, and means for adjusting said post about its vertical axis and locking it in adjusted position.

3. In a device of the class described, in combination, a frame, weighing mechanism including a platform lever, a commodity-receiver supported on said lever, a check link consisting of push and pull members, means for pivotally connecting said check link to said commodity-receiver and said frame, one of said means consisting of a post rotatable about a vertical axis and provided with a knife edge pivot extending at right angles to said axis, and means for adjusting said post about its vertical axis and locking it in adjusted position, said means comprising a pair of screws engaging surfaces formed on said post on opposite sides of said axis.

4. In a device of the class described, in combination, weighing mechanism including a platform, checking means for said platform comprising relatively movable and stationary members, each provided with knife edged plates, links engaging the knife edges thereof, one of said members having spaced depressions, and means including a pair of screws engaging said depressions to adjust said member angularly with respect to its vertical axis.

5. In a device of the class described, in combination, weighing mechanism including a platform, checking means for said platform comprising relatively movable and stationary members, each provided with knife edged plates, links engaging the knife edges thereof, one of said members having spaced depressions, means including a pair of screws engaging said depressions to adjust said member angularly with respect to its vertical axis, and means for locking said member in adjusted position.

6. In a device of the class described, in combination, weighing mechanism including a platform, means for maintaining the platform level throughout weighing movements comprising relatively movable and stationary members, knife edged plates fixed to said members, a pair of links engaging said knife edges, said stationary member having depressions, and screws adapted to engage certain walls of said depressions for angularly adjusting the said stationary member with respect to its longitudinal axis to cause said knife edges to be brought into proper engagement with said links.

7. In a device of the class described, in combination, weighing mechanism including a platform, means for maintaining the platform level throughout weighing movements comprising relatively movable and stationary members, knife edged plates fixed to said members, a pair of links engaging said knife edges, said stationary member having depressions, screws adapted to engage certain walls of said depressions for angularly adjusting the said stationary member with respect to its longitudinal axis to cause said knife edges to be brought into proper engagement with said links, and means for locking said stationary member in adjusted position.

8. In a device of the class described, in combination, weighing mechanism including a platform, means for maintaining the platform level throughout weighing movements comprising relatively movable and stationary members, knife edged plates fixed to said members, a pair of links engaging said knife edges, said stationary member having depressions, screws adapted to engage certain walls of said depressions for angularly adjusting said relatively stationary member with respect to its longitudinal axis to cause said knife edges to be brought into proper engagement with said links, and means for adjusting said relatively stationary member vertically and locking same in adjusted position.

SAMUEL N. HURT.